Feb. 18, 1958 R. L. BARTH 2,823,634
BRAKES FOR INTERNAL ALIGNMENT CLAMPS
Filed March 18, 1954 2 Sheets-Sheet 1

INVENTOR
ROBERT L. BARTH
BY *W. T. Keefer*
ATTORNEY

Feb. 18, 1958 R. L. BARTH 2,823,634
BRAKES FOR INTERNAL ALIGNMENT CLAMPS
Filed March 18, 1954 2 Sheets-Sheet 2

INVENTOR
*ROBERT L. BARTH*

BY
ATTORNEY

United States Patent Office 2,823,634
Patented Feb. 18, 1958

2,823,634
BRAKES FOR INTERNAL ALIGNMENT CLAMPS

Robert L. Barth, New Martinsville, W. Va., assignor to D. M. Curran, trustee, Tulsa, Okla.

Application March 18, 1954, Serial No. 417,097

5 Claims. (Cl. 113—103)

This invention relates to brakes for use in connection with internal alignment clamps of the kind now currently in use in aligning the ends of sections of pipe for welding into a continuous line of pipe.

Internal alignment clamps now in use are generally so contructed that one portion of the clamp is inserted within an open end of a line of pipe and expanded into impingement with the pipe itself. Another portion of the clamp extends outward beyond the mouth or open end of the line of pipe so as to receive a new section of pipe when moved into position and hold such new section in alignment with the last section added to the line of pipe so that the two can be welded together. After the weld is made a rod or chain or some such means extending to the open end of the last section of pipe is used to collapse the clamp and so withdraw it from the line of pipe. This procedure works very well when the line of pipe is being laid along level ground or along a decline. However, when the line of pipe is being laid up an incline, sometimes the clamp-collapsing and withdrawing means breaks or otherwise fails to withdraw the clamp. Then sometimes the clamp will slip backwards through the line of pipe to the lowest point of the land and in order to extract it, the line of pipe must be cut in order to remove the clamp—an expensive and time consuming operation.

The purpose of the present invention is to provide a brake which will prevent the slipping of the clamp backward through the line of pipe so that, even if the clamp-withdrawing means should become broken or otherwise fail, the clamp can be withdrawn by means of grappling apparatus without cutting the line of pipe. One of the objects, therefore of the present invention is to provide a device for use in connection with an internal alignment clamp that will effectually prevent the same from slipping rearwardly.

Another object of the present invention is to provide such a device of simple and inexpensive construction that can be used with an internal alignment clamp of any design now in use.

In describing the invention in detail reference will be made to the accompanying drawings in which—

In said drawings the numeral 11 indicates a section of a line of pipe to which a new section 12, is to be welded. The numeral 13 indicates generally an internal alignment clamp of the kind now in common use and 14 indicates the bead of metal formed at the point of weld. None of those devices constitutes any part of the present invention.

Figure 1:
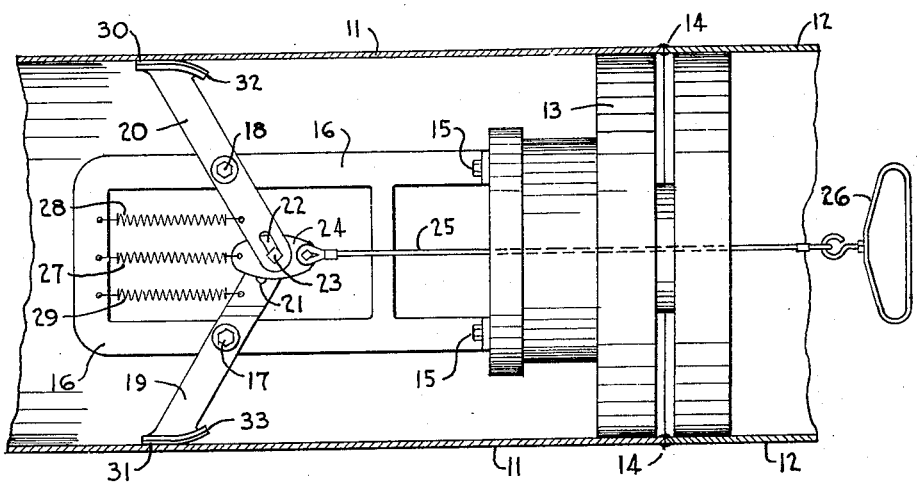
Fig. 1 is a longitudinal view partly in section illustrating one embodiment of the invention attached to an internal alignment clamp and contained within a line of pipe.
Figure 2:
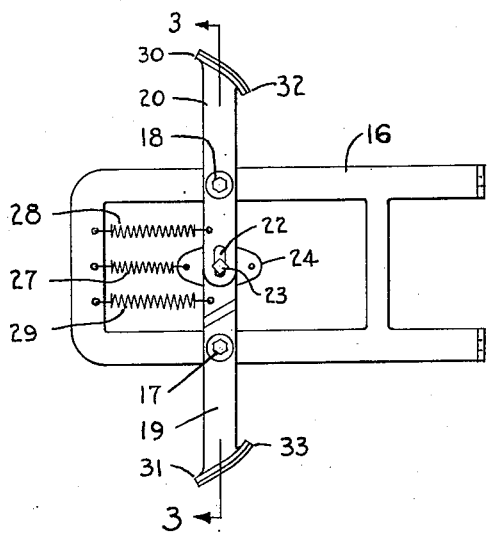
Fig. 2 is a plan of one embodiment of the invention with the legs extended.
Figure 3:
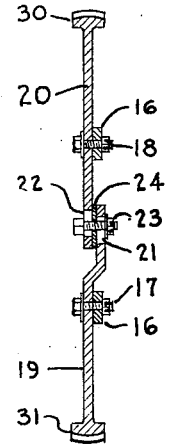
Fig. 3 is a cross section of the same taken on the line 3—3, Fig. 2.

Attached to the rear end of the clamp 13, as by means of bolts 15, is a frame 16, which, in the embodiment illustrated in Figs. 1 to 3, inclusive, is of substantially U-shape. Pivoted to the sides of said frame, as by bolts 17 and 18, are legs 19 and 20. The inward ends of said legs are slotted as at 21 and 22, and have received loosely in said slots a bolt 23. Said bolt 23, also passes through a slotted plate or yoke, 24.

Swiveled to the forward end of yoke 24, is a rod or cable, 25. That rod or cable extends through the clamp 13, to a point forward of the same, and attached to the forward end of said rod or cable 25, is a grip 26.

Extending from the rear end of the yoke 24, to some point on the frame 16, is a coil spring 27, designed normally to hold the yoke 24, and attached parts, when not in use in a pipe, retracted substantially to the positions illustrated in Fig. 2. Auxiliary springs 28 and 29, may also, if desired, be used connecting the legs 19 and 20, to the rear end of said frame 16, so that if any one of the springs should fail, the others or other would hold.

Formed at the outer end of the leg 20, is a shoe 30, and at the outer end of the leg 19, is a shoe 31. Each of these shoes has its forward end or toe 32 and 33, respectively, curved inwardly.

In order to enable the clamp 13, with the attached mechanism, constituting this invention, to be placed in the open end of a line of pipe, the grip 26, is drawn forward so as to draw the legs 19 and 20, substantially to the position shown in Fig. 1 or drawn slightly more inward and in this position the clamp may be placed within the open end of the line of pipe in the position shown in Fig. 1. When properly positioned, the grip 26, is released allowing the shoes 30 and 31, by virtue of the tension placed upon the legs 19 and 20, by the springs 27, 28 and 29, to be moved into impinging or frictional position against the interior wall of the pipe 11. Said springs maintain said shoes in constant impingement against the interior walls of the pipe and so prevent the brake, together with the clamp to which it is attached, from slipping or sliding rearwardly through said line of pipe. After the weld is completed at the point 14, and the clamp 13, is collapsed for withdrawal to the position for the next weld, the shoes 30 and 31, remain in impingement against and in the process of withdrawal slide along the interior wall of the pipes 11 and 12, and thus effectively prevent slipping or sliding rearwardly of the entire mechanism.

Sometimes the weld joining the sections of pipe forms an interior bead. The inwardly curved forward ends 32 and 33 of the shoes 30 and 31, are designed to ride over the bead at the point of the weld, as well as any other irregularity in the interior of the pipe.

It will be observed that the forward angle between the legs 19 and 20, and the adjacent walls of the pipe 11, are acute angles, and that, therefore, rearward force exerted by the pull of gravity, or otherwise, upon the frame 16, would tend to force the shoes 30 and 31, more tightly against the walls of the pipe against which they impinge, thus effectively preventing rearward movement. On the other hand, pressure or traction in the opposite direction would tend to lessen the pressure of the shoes against the walls of the pipe so as to afford a minimum of resistance to forward movement, notwithstanding the force exerted by the springs 27, 28 and 29, which would retain the shoes 30 and 31, at all times in impingement against the pipe walls and so constantly ready at all times to resist backward movement.

Figures 4, 5:
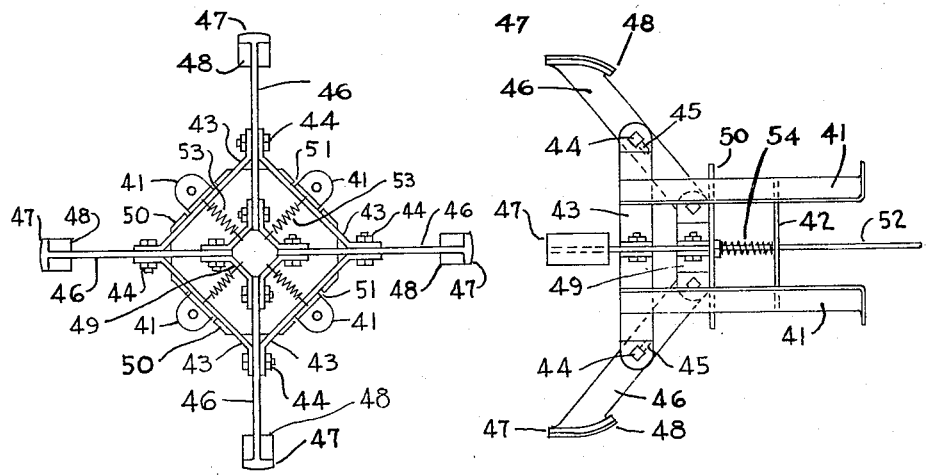
Fig. 4 is a rear elevation of a modification of the invention.
Fig. 5 is a side view of the modification illustrated in Fig. 4.

In the modification illustrated in Figs. 4 and 5 of the drawings, the framework consists of four regularly spaced bracket members 41, designed to be bolted to the rear end of an internal alignment clamp. Said brackets are held in fixed relation to each other by a plate 42, welded or otherwise rigidly attached thereto, as shown. Mounted upon the rear end of each of said brackets is a cross arm 43. The ends of said cross arms approach each other at right angles and have portions formed parallel to each other so as to receive bolts 44. Each of those bolts extends through a slot as 45 in legs 46, and each of said bolts affords a sliding bearing for one of said legs. Each of said legs bears, at its outer end, a shoe 47, with an inwardly curved toe 48, like similar parts shown in Figs. 1, 2 and 3. The inward ends of the legs 46, are swiveled to bearing brackets 49, and the latter are rigidly mounted, as by welding, to a yoke plate 50, extending crosswise of the brackets 41. Said plate 50 has its outer margin recessed, as at 51, so as to form guides or channels in which the bracket members 41, are slidably received.

Affixed to the yoke plate 50 is a rod 52, extending through an aperture in the plate 42, thence through the clamp (not shown in these figures) and terminating in a grip (also not shown) as has been explained in connection with Figs. 1, 2 and 3.

The yoke plate 50, with attached parts is normally drawn rearwardly, and hence the legs 46 extended outwardly by means of springs 53, connecting the bearing brackets 49, with the cross arms 43, or by a spring 54, disposed about the rod 52, and having its opposite ends impinging against the plate 42, and the yoke 50.

Figures 6, 7:
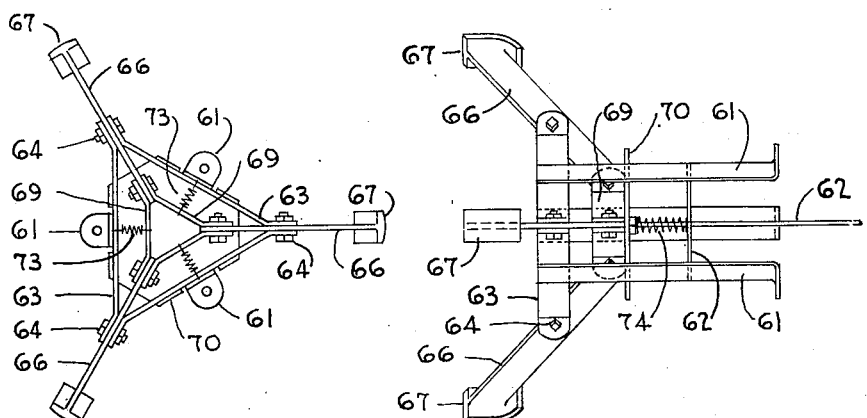
Fig. 6 is a rear elevation of another modification.
Fig. 7 is a side view of the modification illustrated in Fig. 6.

In the modification illustrated in Figs. 6 and 7, three bracket elements 61 are provided, braced by a crossplate 62, and carrying cross arms 63, and bearing bolts 64. The bolts 64 are slidably received within longitudinal slots (not shown) formed in the legs 66, and each leg has formed at the outer end thereof a shoe 67. The opposite ends of said legs are pivotally received in bearings 69, mounted on yoke 70. Like corresponding parts shown in Figs. 4 and 5, the yoke 70, and attached parts are actuated by springs 73 (Fig. 6) or 74 (Fig. 7).

Manifestly, in the embodiment of this invention illustrated in Figs. 4 and 5, and also in that illustrated in Figs. 6 and 7, either the springs 53 (73), may be used, or in lieu thereof the spring 54 (74), or, if desired, all such springs may be used. In order to guard against spring failure, however, it is believed better to use more than one spring, although any one, in the absence of failure, should be sufficient.

Although in the drawings only three embodiments of my invention are illustrated, it will readily be understood that other modifications may be made without departing from the spirit of the invention.

I claim:

1. In an internal pipe alignment clamp, a pipe engaging brake therefor comprising a support extending from one side of said clamp for being positioned longitudinally of one section of pipe when said clamp is in use, a plurality of legs pivotally mounted intermediate their extremities on said support and extending from the latter in a direction away from said one side of the clamp, resilient means coupled with the legs adjacent the inner extremity thereof and yieldably biasing said legs toward a normal position extending laterally of said support whereby the outer extremity of the legs will bear against the interior surface of a pipe section containing the same braking longitudinal movement of said clamp therein, and control means extending through said clamp to the opposite side thereof and connected to the inner extremity of said legs for moving the same inwardly away from said normal position against the action of said resilient means.

2. In an internal pipe alignment clamp, a pipe engaging brake therefor comprising a support extending from one side of said clamp for being positioned longitudinally of one section of pipe when said clamp is in use, a plurality of legs pivotally connected at a medial portion thereof to said support for swinging movement between a released position extending from the support in a direction away from said one side of the clamp and a normal position extending outwardly from the support substantially radially thereof, resilient means coupled with the legs adjacent the inner extremity thereof and tending to move said legs towards said normal position, friction members each carried by one of said legs, and manually operable means extending through said clamp to the opposite side thereof and connected to the inner end of said legs whereby the same can be pivoted to said released position against the action of said resilient means when desired.

3. In an internal pipe alignment clamp, a pipe engaging brake therefor comprising a supporting frame extending from one side of said clamp with elements of said frame arranged for being positioned longitudinally of pipe section when said clamp is in use, a plurality of legs each pivotally connected intermediate its extremities to one of said frame elements for movement from a released position in line with said element and extending therefrom away from said one side of the clamp to a normal position extending substantially perpendicular therefrom, friction members each mounted on one end of one of said legs and extending on an angle laterally thereof, resilient means connecting the other ends of said legs and said frame tending to pivot said legs to their normal position relative to said frame and means for pivoting said legs towards their released position relative to said frame.

4. In an internal pipe alignment clamp, a pipe engaging brake therefor comprising a substantially U-shaped frame whose ends are connected to one side of said clamp, a pair of elongated legs each pivotally connected at a medial portion thereof to a corresponding side element of said frame, resilient means connecting and tending to pivot the inner ends of said legs toward the base of said frame, manually operable means for pivoting said inner leg ends away from said frame base when required, and friction members each carried by an outer end of one of said legs and positioned for engaging a pipe section containing said clamp when said legs have their inner ends pivoted toward the base and their outer ends extending laterally of said frame for retaining said clamp against movement longitudinally of said pipe.

5. In an internal pipe alignment clamp, a pipe engaging brake therefor, comprising a plurality of elongated support members rigidly connected at one end to said clamp and positioned for extending longitudinally of a pipe containing said clamp, connectors extending laterally of and rigidly connecting the opposite end of said members, a plurality of legs pivotally connected at a medial portion thereof to said connectors and positioned for pivoting laterally of said supports, means pivotally linking the inner ends of said legs, resilient means connecting said linking means to said connectors tending to pivot said legs towards positions radial to the members, means for moving said linking means against the action of said resilient means when desired to swing the legs into positions extending from the connectors in a direction away from the clamp, and friction members each carried by the other end of one of said legs extending laterally of and on an angle to its respective leg.

References Cited in the file of this patent

UNITED STATES PATENTS

| | | |
|---|---|---|
| 1,962,297 | Candy et al. | June 12, 1934 |
| 2,043,020 | Thiemer | June 2, 1936 |
| 2,522,459 | Mitchell | Sept. 12, 1950 |
| 2,523,519 | Reeves | Sept. 26, 1950 |
| 2,729,354 | Zepelovitch | Jan. 3, 1956 |